United States Patent
Kats et al.

(10) Patent No.: US 11,075,951 B1
(45) Date of Patent: Jul. 27, 2021

(54) QUERY LEARNING FOR AUTOMATED INCIDENT INVESTIGATION AND REMEDIATION

(71) Applicant: NortonLifeLock Inc., Tempe, AZ (US)

(72) Inventors: Daniel Kats, Los Angeles, CA (US);
Brian Schlatter, Playa Vista, CA (US);
Michael Hart, Farmington, CT (US);
Steven Meckl, Ashburn, VA (US); Jung Hui Yoon, Herndon, VA (US); Matteo Dell'Amico, Antibes (FR)

(73) Assignee: NortonLifeLock Inc., Tempe, AZ (US)

( * ) Notice: Subject to any disclaimer, the term of this patent is extended or adjusted under 35 U.S.C. 154(b) by 242 days.

(21) Appl. No.: 16/024,528

(22) Filed: Jun. 29, 2018

(51) Int. Cl.
| | |
|---|---|
| *G06F 21/00* | (2013.01) |
| *H04L 29/06* | (2006.01) |
| *G06N 5/02* | (2006.01) |
| *G06F 16/245* | (2019.01) |
| *G06F 16/28* | (2019.01) |
| *G06F 16/23* | (2019.01) |

(52) U.S. Cl.
CPC .......... *H04L 63/20* (2013.01); *G06F 16/2358* (2019.01); *G06F 16/245* (2019.01); *G06F 16/285* (2019.01); *G06N 5/02* (2013.01)

(58) Field of Classification Search
CPC ..... H04L 63/20; G06F 16/245; G06F 16/285; G06F 16/2358; G06F 21/6218; G06F 21/50; G06F 21/55; G06N 5/02
See application file for complete search history.

(56) References Cited

U.S. PATENT DOCUMENTS

| | | | | |
|---|---|---|---|---|
| 7,653,633 | B2 * | 1/2010 | Villella | G06F 11/3476 |
| | | | | 707/648 |
| 8,156,553 | B1 * | 4/2012 | Church | G06Q 10/06 |
| | | | | 726/22 |
| 8,677,505 | B2 * | 3/2014 | Redlich | G06F 21/577 |
| | | | | 726/27 |
| 9,038,170 | B2 * | 5/2015 | Joshi | H04L 63/1425 |
| | | | | 726/22 |
| 9,639,601 | B2 * | 5/2017 | Proux | G06F 16/3334 |
| 9,916,468 | B2 * | 3/2018 | Long | G06F 21/55 |
| 9,998,443 | B2 * | 6/2018 | Cetlur | H04L 63/102 |

(Continued)

OTHER PUBLICATIONS

Scott Miserendino, et al., ThreatVectors: contextual workflows and visualizations for rapid cyber event triage, Jun. 19-20, 2017, 2017 International Conference On Cyber Incident Response, Coordination, Containment & Control (Cyber Incident), pp. 1-8.*

(Continued)

*Primary Examiner* — Maung T Lwin
(74) *Attorney, Agent, or Firm* — Holland & Hart LLP

(57) ABSTRACT

A method for learning queries in automated incident remediation is performed by one or more computing devices, each comprising one or more processors. The method includes parsing at least a portion of incidents from an incident log based at least in part on one or more incident types associated with each incident from the portion of the incidents, identifying parameters associated with a plurality of queries, grouping the plurality of queries into a plurality of query groups based at least in part on the identified parameters, identifying a new incident added to the incident log, and generating an automated query based at least in part on a similarity between the new incident and a prior incident.

16 Claims, 10 Drawing Sheets

(56) References Cited

U.S. PATENT DOCUMENTS

| | | | | |
|---|---|---|---|---|
| 10,250,617 | B1* | 4/2019 | Gardner | G06F 21/566 |
| 10,303,688 | B1* | 5/2019 | Sirin | G06F 16/24542 |
| 10,409,817 | B1* | 9/2019 | Dias | G06F 16/11 |
| 10,482,394 | B2* | 11/2019 | Syed | G06F 16/25 |
| 10,587,642 | B1* | 3/2020 | Herman-Saffar | H04L 63/1416 |
| 2004/0024724 | A1* | 2/2004 | Rubin | G06N 5/025 706/55 |
| 2008/0016569 | A1* | 1/2008 | Hammer | G06F 21/554 726/23 |
| 2008/0040191 | A1* | 2/2008 | Chakravarty | G06Q 10/063114 705/7.15 |
| 2011/0055202 | A1* | 3/2011 | Heimendinger | G06F 16/245 707/721 |
| 2013/0203440 | A1* | 8/2013 | Bilange | H04W 4/021 455/456.2 |
| 2014/0259170 | A1* | 9/2014 | Amsler | H04L 63/20 726/23 |
| 2015/0026692 | A1* | 1/2015 | Ghosh | G06F 9/4881 718/103 |
| 2016/0147891 | A1* | 5/2016 | Chhichhia | G06F 16/986 707/734 |
| 2017/0063890 | A1* | 3/2017 | Muddu | G06F 3/04847 |
| 2018/0284710 | A1* | 10/2018 | Abe | G05B 19/048 |
| 2020/0034363 | A1* | 1/2020 | Marquardt | G06F 16/2228 |
| 2020/0057756 | A1* | 2/2020 | Giuca | G06F 16/245 |

OTHER PUBLICATIONS (Infosecinstitute, Log Analysis for Web Attacks: A Beginner's Guide, https://resources.infosecinstitute.com/log-analysis-web-attacks-beginners-guide/#gref, Sep. 27, 2015, hereinafter Infosecinstitute).*

(Jihad Zahir, et al., Access plan recommendation: A clustering based approach using queries similarity, 2014 Second World Conference on Complex Systems (WCCS), Nov. 10-12, 2014, hereinafter Zahir).*

Javad Akbarnejad et al. "SQL QueRIE Recommendations," The 36th International Conference on Very Large Data Bases, Sep. 13-17, 2010, Singapore: http://www.comp.nus.edu.sg/~vldb2010/proceedings/files/papers/D21.pdf. Accessed Jul. 2, 2018.

Christopher Miles. "More Like This: Query Recommendations for SQL." Dept. of Computer Science and Engineering, University of Washington, Seattle, WA. https://courses.cs.washington.edu/courses/cse544/11wi/projects/miles.pdf. Accessed Jul. 2, 2018.

Jihad Zahir, Abderrahim El Qadi, and Driss Aboutajdine. "Access Plan Recommendation Using SQL Queries Similarity." WSEAS Transaction and Computers, vol. 14 (2015): http://www.wseas.org/multimedia/journals/computers/2015/b265705-862.pdf. Accessed Jul. 2, 2018.

Zahir J., El Qadi A., Bellatreche L. "Identifying SQL Queries Similarity Using SVM." In: Arik S., Huang T., Lai W., Liu Q. (eds.) Neural Information Processing. ICONIP 2015. Lecture Notes in Computer Science, vol. 9492. Springer, Cham. https://link.springer.com/chapter/10.1007/978-3-319-26561-2_77. Accessed Jul. 2, 2018.

Patrick Marcel and Elsa Negre. "A survey of query recommendation techniques for datawarehouse exploration." Nantes University, France. https://pdfs.semanticscholar.org/05f0/c11bcf9429e0fd0fdb2bf8970b7f1ab85d7b.pdf. Accessed Jul. 2, 2018.

Jihad Zahir, Abderrahim El Qadi, and Salma Mouline. "Access plan recommendation: A clustering based approach using queries similarity." Second World Conference on Complex Systems (WCCS), Nov. 10-12, 2014. http://ieeexplore.ieee.org/abstract/document/7060936/. Accessed Jul. 2, 2018.

IncMan—Incident Response Platform for Security Operations Center. DFLabs. https://www.dflabs.com/solution/incident-response-platform-soc/. Accessed Jul. 2, 2018.

McAfee Investigator: Automated, Expert System-Based Analytics to Transform the SOC. https://securingtomorrow.mcafee.com/business/introducing-mcafee-investigator-automated-expert-system-based-analytics-transform-soc/. Accessed Jul. 2, 2018.

Phantom Platform: Phantom Supercharges Security Operations. https://www.phantom.us/platform/. Accessed Jul. 2, 2018.

Demisto: Gartner SOAR Report. https://www.demisto.com/. Accessed Jul. 2, 2018.

* cited by examiner

QUERY LEARNING FOR AUTOMATED INCIDENT INVESTIGATION AND REMEDIATION

BACKGROUND

The use of computer systems and computer-related technologies continues to increase at a rapid pace. The expansive use of computer systems has influenced the advances made to computer-related technologies. Computer systems have increasingly become an integral part of the business world and the activities of individual consumers. Computer systems may be used to carry out several business, industry, and academic endeavors.

The widespread use of computers and mobile devices has caused an increased presence in malicious behavior including data theft, embedding malware and viruses, and the like. Analysts may receive incident reports regarding potential malware. However, in some cases, a conventional system may pull in incomplete information or insufficiently parse a log line, or both, resulting in the analyst having to manually track down information that was not provided by the conventional system.

SUMMARY

According to at least one embodiment, a method for learning queries in automated incident remediation is described. The method may be performed by one or more computing devices where each has one or more processors. The method may include parsing at least a portion of incidents from an incident log based at least in part on one or more incident types associated with each incident from the portion of the incidents, identifying parameters associated with multiple queries, grouping the multiple queries into multiple query groups based at least in part on the identified parameters, identifying a new incident added to the incident log, and generating an automated query based at least in part on a similarity between the new incident and a prior incident. In some cases, multiple queries may be performed on the incidents from the incident log. In some cases, the prior incident may be added to the incident log prior to identifying the new incident.

At least one field of the automated query may be automatically pre-populated based at least in part on one or more parameters of a query associated with the prior incident. In some cases, modifying the automated query based at least in part on user input and adding the modified automated query to at least one query group from multiple query groups. In one example, the method may include identifying one or more parameters of a user query performed on the new incident and adding the user query to at least one query group from multiple query groups based at least in part on the one or more parameters of the user query. In some cases, the method may include performing a security action based at least in part on analysis of the new incident.

Performing the security action may include at least one of identifying potential malware as a result of performing one or more of multiple queries, quarantining software associated with the new incident, quarantining a remote computing device associated with the new incident, wiping or resetting the remote computing device associated with the new incident, updating one or more firewall rules of a network device associated with the new incident, or any combination thereof. The incident log may record incidents associated with one or more remote computing devices. Each query from multiple queries may be associated with at least one incident from the incident log.

At least one of the queries from multiple queries may be performed on a parsed portion of the incident log. At least one of the queries from multiple queries may be performed on an unparsed portion of the incident log. Additionally, the method may also include purging a poor performing query from multiple query groups. In some cases, the poor performing query may be identified based at least in part on the poor performing query not being used within a predetermined time period or a poor search result associated with execution of the poor performing query, or both.

A computing device configured for learning queries in automated incident remediation is also described. The computing device may include a processor, memory in electronic communication with the processor where the memory stores computer executable instructions that when executed by the processor cause the processor to perform the steps of parsing at least a portion of incidents from an incident log based at least in part on one or more incident types associated with each incident from the portion of the incidents, identifying parameters associated with multiple queries, grouping multiple queries into multiple query groups based at least in part on the identified parameters, identifying a new incident added to the incident log, and generating an automated query based at least in part on a similarity between the new incident and a prior incident. In some examples, the prior incident may be added to the incident log prior to identifying the new incident. In some examples, the queries may be performed on the incidents from the incident log.

A computer-program product for using customer context to detonate malware is also described. The computer-program product may include a non-transitory computer-readable medium storing instructions thereon. When the instructions are executed by one or more processors, the execution of the instructions may cause the one or more processors to perform the steps of parsing at least a portion of incidents from an incident log based at least in part on one or more incident types associated with each incident from the portion of the incidents, identifying parameters associated with multiple queries, grouping the multiple queries into multiple query groups based at least in part on the identified parameters, identifying a new incident added to the incident log, and generating an automated query based at least in part on a similarity between the new incident and a prior incident. In some cases, multiple queries may be performed on the incidents from the incident log. In some examples, the prior incident may be added to the incident log prior to identifying the new incident. In some cases, multiple queries may be performed on the incidents from the incident log.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
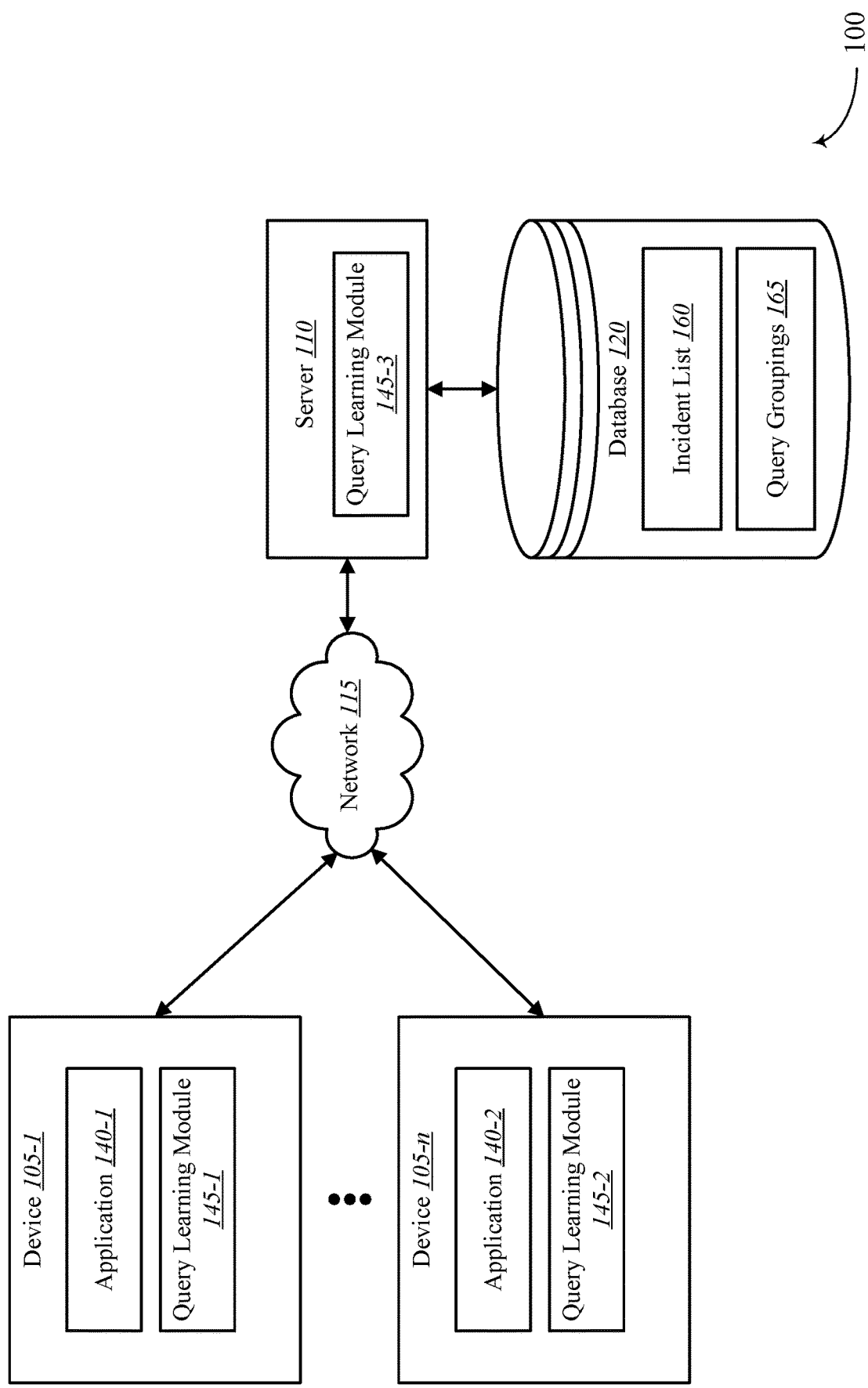
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to learning queries. More specifically, the systems and methods described herein relate to learning queries for automated incident investigation and remediation. The principles described in the present disclosure involve the security orchestration, automation and remediation fields. The principles described herein also include learning and automating analyst tasks in the security orchestration, automation and remediation fields.

Incident investigation and remediation are often a manual process. Some incident investigations may follow a common pattern. In these situations, the analyst may track down common pieces of information that are not provided in the initial incident report, often due to the detection modules pulling in incomplete information, or insufficiently parsing incident logs.

In some cases, an analyst may create a query to investigate an incident. The analyst may save his or her most commonly used queries locally or pull from a document of commonly used queries. These lists of commonly used queries are not context-dependent and do not dynamically evolve over time.

Similarly, remediation may also involve scenarios that use a pre-built script for a given incident type which varies only in input parameters such as hostname, connection credentials, and internet protocol (IP)/domain information to help isolate and blacklist. By clustering incidents, inferring query parameters, and matching those against the log lines to which they belong, the investigation and remediation process may be automated or at least semi-automated. The principles described herein may include automatically and continuously generating relevant workflows based on past actions of one or more analysists and flexibly and actively recommending new queries rather than relying on static scripts or playbooks.

In response to a new incident, an investigation may involve using a query interface to review related incidents and events within the product database, pull additional unparsed information from the raw log line, investigate the relevant machine involved with the incident and look at specific processes that may have been involved with the incident. Similarly, remediating an incident may involve updating firewall rules on the targeted network device, wiping the infected machine, and quarantining the infected machine in the network.

The incidents and related events may be grouped into similarity categories. Grouping may be facilitated at least in part by a natural classification of incidents complied by both analysts and detection tools. The queries run by the analyst in response to the incident or remediation may be collected over time and/or continuously. The queries may be matched against each other for similarities and similarly clustered. The system may make a preliminary attempt to parameterize related queries in a database and update the database as new queries come in.

In some cases, a parameterized query may be formed as the database obtains a dataset that is substantial enough to recognize incident types and similarities and pull from a group of queries previously used by the analyst to investigate and/or remediate the event. This process may be accelerated by asking the analyst for feedback on preliminary attempts at query parameterization. The parameters of the incidents may be matched against the contents of the log line, as well as against the results from previous queries. Thus, the parameters may be first learned, then automatically filled in for subsequent incidents.

When an analyst next encounters that type of incident, the system may present the analyst with queries for investigation and remediation, often with pre-populated field values. Queries may be suggested based on a similarity metric to the incident type. Analysts may then mix and match the queries which they find most useful. Some of the recommended queries may be successful while other queries may fail. The query success may be tracked, and the system may be augmented with a tool for evaluating the usefulness (informational content) of the result. Queries which do not yield fruitful results (e.g., seldom used, error prone results, error prone execution, poor feedback for a query, etc.) may be purged from the query dataset.

In some cases, the system may include a natural language interface for its queries. In some cases, the present systems and methods may be applied at a level below the natural language interface, after normalization and disambiguation takes place. In some cases, the analyst interactions may be parsed into queries against the backend. This tool might work over the backend queries rather than directly what analysts type. This approach may involve a reverse-translation layer to suggest queries to the analyst.

FIG. 1 is a block diagram illustrating one embodiment of an environment 100 in which the present systems and methods may be implemented. In some embodiments, at least some of the systems and methods described herein may be performed by and/or on a device (e.g., at least device 105-1). As depicted, the environment 100 may include at least device 105-1. In some cases, environment 100 may include device 105-1 to 105-n, where n is any positive integer. In some embodiments, environment 100 may include server 110, database 120, and a network 115 that allows the devices 105-1 to 105-n, the server 110, and database 120 to communicate with one another.

Examples of the devices 105-1 to 105-n may include any combination of mobile devices, smart phones, personal computing devices, computers, laptops, desktops, servers, media content set top boxes, routers, or any combination thereof. In some cases, devices 105-1 to 105-n may include data from analysts and may send the analyst data to server 110 over network 115. Examples of server 110 may include any combination of a data server, a cloud server, an automation server, proxy server, mail server, web server, application server, database server, communications server, file server, home server, mobile server, name server, or any combination thereof.

In some configurations, at least one of the devices 105-1 to 105-n may include an application 140 (e.g., application 140-1 and application 140-2, respectively), and query learning module 145 (e.g., query learning module 145-1 and query learning module 145-2, respectively). In some cases, at least one of devices 105-1 to 105-n may include one or more user interfaces. In one example, application 140 may include one or more user interfaces. Although the components of the 105-1 to 105-n are depicted as being internal to the devices 105-1 to 105-n, it is understood that one or more of the components may be external to the devices 105-1 to 105-n and connect to devices 105-1 to 105-n through wired and/or wireless connections. In some embodiments, application 140 may be installed on a remote computing device in order to allow a remote user to interface with a function of devices 105-1 to 105-n, query learning module 145, and/or server 110.

In some embodiments, devices 105-1 to 105-n may communicate with server 110 via network 115. The network 115 may also be in communication with the voice assistant 170, the cloud service 180, and other devices that are to carry out the user commands interpreted by the cloud service 180. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the devices 105-1 to 105-n may not include a query learning module 145. For example, device 105 may include application 140 that allows devices 105-1 to 105-n to interface with a remote device via query learning module 145 located on another device such as a remote computing device and/or server 110. In some embodiments, devices 105-1 to 105-n and server 110 may include a query learning module 145 where at least a portion of the functions of query learning module 145 are performed separately and/or concurrently on devices 105-1 to 105-n and/or server 110. Likewise, in some embodiments, a user may access the functions of devices 105-1 to 105-n (directly or through devices 105-1 to 105-n via query learning module 145) from a remote computing device. For example, in some embodiments, a remote computing device includes a mobile application that interfaces with one or more functions of devices 105-1 to 105-n, query learning module 145, and/or server 110.

In some embodiments, server 110 may be coupled to database 120. Database 120 may be internal or external to the server 110. In one example, devices 105-1 to 105-n may be coupled directly to database 120, database 120 being internal or external to devices 105-1 to 105-n. Database 120 may include an incident list 160 and query groupings 165. For example, devices 105-1 to 105-n may access the incident list 160 in database 120 over network 115 via server 110. The incident list 160 may include those incidents that have occurred on the network and may be recorded as new incidents are recorded on the network. The query groupings 165 may include queries that have been inputted by the analysts to investigate or remediate issues stemming from the incident. The queries may be grouped according to their similarities.

The query learning module 145 may cause the queries to be grouped. Further, the query learning module 145 may also compare the new incidents to the attributes of the query listings and find similarities and their previously used queries. The query learning module 145 may then cause the appropriate, previously used queries to be automatically presented to the analyst. This may save the analyst time in formulating a new query from scratch and also assists the analyst by proposing queries that have a higher likelihood of getting to the root cause of the incident. The analyst may override the proposed query and type in a query desired by the analyst. Thus, the proposed query may assist the analyst without dictating the investigation or remediation process.

Overtime, the system may pull from multiple queries that have similarities to the incident to propose a parameterized query. A parameterized query may be more than merely proposing a previously used query, but is rather a modified previous used query or a new constructed query that is determined to have a likelihood of being more relevant based on the similarities of the incident. The parameterized query may pull from incidents with attributes and form a query that is intended to be more on-point.

The query learning module 145 may also evaluate the success rate of the queries. In those situations where the proposed queries are not successful, that particular query may be purged from the system.

Figure 2:
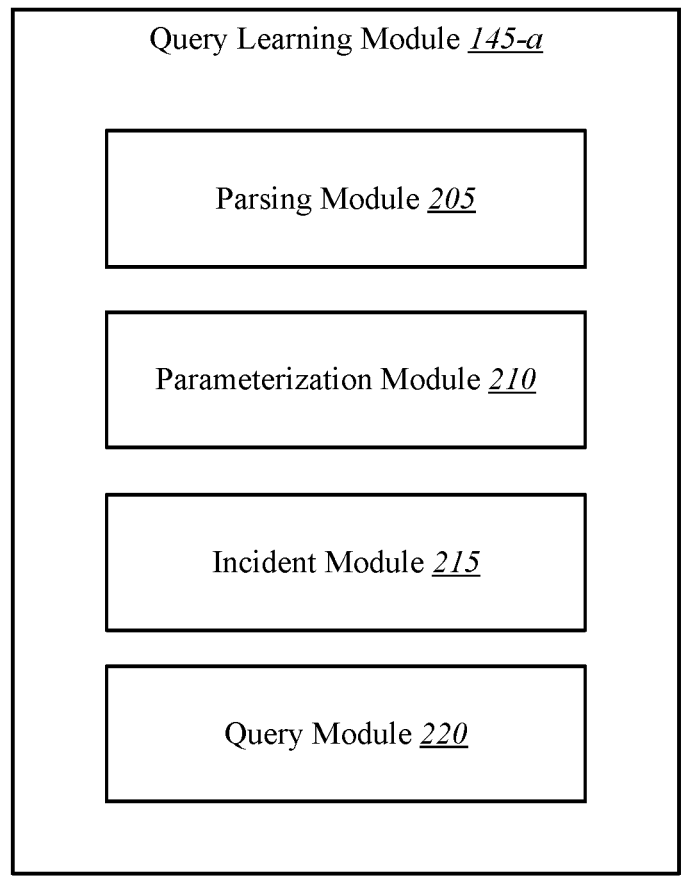
FIG. 2 is a block diagram illustrating one example of a query learning module.

FIG. 2 is a block diagram illustrating one example of a query learning module 145-a. The query learning module 145-a may be one example of the query learning module 145 depicted in FIG. 1. As depicted, the query learning module 145-a may include a parsing module 205, a parameterization module 210, an incident module 215, and a query module 220.

The parsing module 205 may parse at least a portion of incidents from an incident log based at least in part on one or more incident types associated with each incident from the portion of the incidents. In some cases, the parsing module 205 may access a database with an incident list and parse out the different portions of the incident. In some cases, the parsing module 205 breaks the incident into at least one of identification parameters, username parameters, password parameters, access parameters, permission parameters, account parameters, data storage parameters, other types of parameters, hostname parameters, connection credential parameters, domain information parameters, or combinations thereof.

The parameterization module 210 may identify parameters associated with multiple queries. These queries may have been previously performed on the incidents from the incident log. Further, the parameterization module 210 may group the multiple queries into multiple query groups based at least in part on the identified parameters. For example, those incidents that are connected to users with the same identification parameter may be grouped into a similar category and stored together. The parameterization module 210 may also group queries that were entered into the system by an analyst in response to each of the incidents in the grouping. For example, if multiple incidents are categorized into the group associated with a single user identifier, the queries that were inputted into the system to investigate each of those incidents that are now grouped together may also be grouped together.

The incident module 215 may identify a new incident added to the incident log. For example, when a new incident occurs, the incident may be added to the incident list in the database. In some cases, the incident list is the same incident list that was previously parsed and parameterized. In some examples, the database, a device, or another entity may send a notice to the incident module 215 that an incident has been added to the list.

The query module 220 may generate an automated query based at least in part on a similarity between the new incident and a prior incident. In some cases, the prior incident may be added to the incident log prior to identifying the new incident. The query may be a previously used query. In another example, the query is a unique query that is tailored to the specific parameters of the new incident. For example, if the new incident has parameters A and B, the unique query may include a portion that reflects the queries that were previously made when other incidents included parameter A, and another portion of the unique query may reflect queries that were previously made in response to incidents that included parameter B. In some cases, the unique query may be a hybrid of queries that were previously made.

In some cases, some of the parameters of the new incident may be unknown. In these situations, the parameter of the previous incidents that have similarities to the new incident may be inferred to also be included in the new incident. As a result, the missing information about the new incident may be automatically filled and when the query is run. In those situations where the inferred parameters are incorrect, the query may perform poorly causing the inferred parameters to be purged from the query or the modified query with the inferred parameters to be purged entirely from the system. The poor performance of the query with the inferred parameters may be recorded so that the system can rate inferred parameters by their likelihood of being success. By rating the success of the inferred parameters, the query module 220 can learn over time which parameters to infer in future situations.

Figure 3:
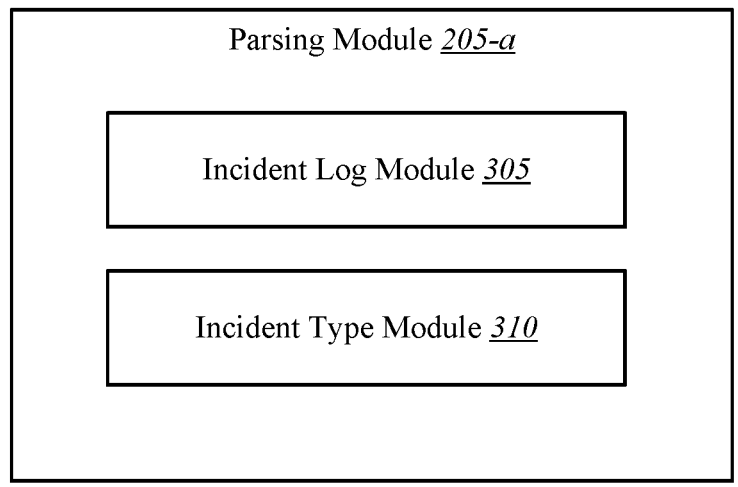
FIG. 3 is a block diagram illustrating one example of parsing module.

FIG. 3 is a block diagram illustrating one example of a parsing module 205-a. The parsing module 205-a may be one example of parsing module 205 depicted in FIG. 2. As depicted, the parsing module 205-a may include an incident log module 305 and an incident type module 310.

The incident log module 305 may maintain a list of incidents. In this example, the incident module adds new incidents that occur in the network or to a particular device on the network. In other examples, the incident log module 305 may send incident information to a remote location, such as a database associated with a remote server, where the incident list is maintained. In this example, the incident log module 305 may retrieve information about the incidents from the remotely maintained list as needed.

The incident type module 310 may determine the types of incidents in the incident list. In some cases, the incident list may flag information about the incident type. In other examples, the incident list may be organized by incident type.

Figure 4:
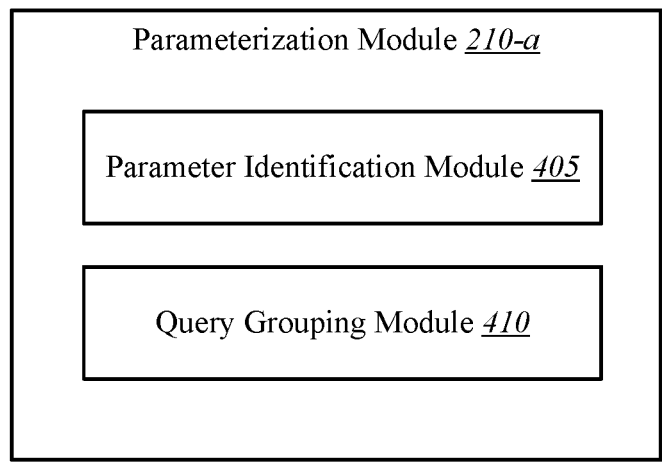
FIG. 4 is a block diagram illustrating one example of a parameterization module.

FIG. 4 is a block diagram illustrating one example of a parameterization module 210-a. The parameterization module 210-a may be one example of the parameterization module 210 depicted in FIG. 2. As depicted, the parameterization module 210-a may include a parameter identification module 405 and a query grouping module 410.

The parameter identification module 405 may identify different types of parameters of the incidents. A non-exhaustive list of parameters associated with the incidents may include at least one of identification parameters, username parameters, password parameters, access parameters, permission parameters, account parameters, data storage parameters, other types of parameters, hostname parameters, connection credential parameters, domain information parameters, or combinations thereof.

The query grouping module 410 may group the queries together that are associated with the identified incident parameters. For example, incident A may include parameter B. In this example, incident A may be associated with parameter B. Query C may have been inputted during the investigation and remediation of incident A and may be associated with parameter B. In this instance, parameter B may be associated with query C. Other queries may also be associated with parameter B.

Figure 5:
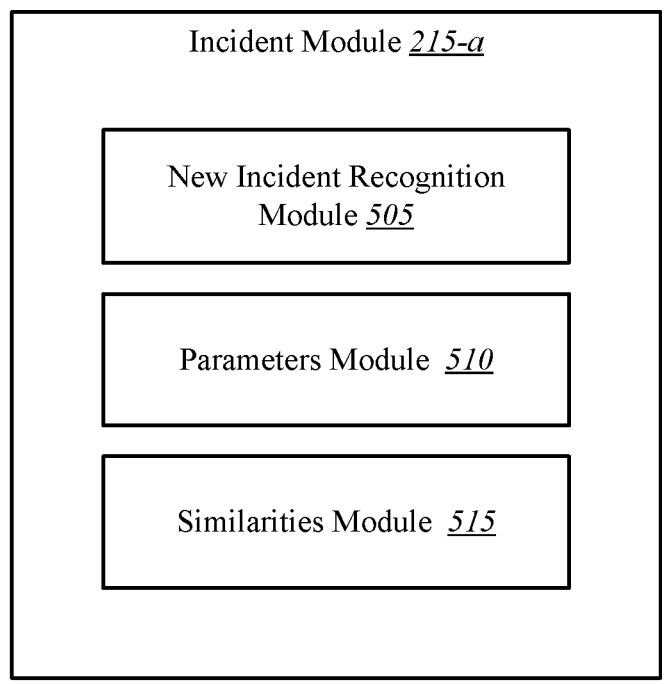
FIG. 5 is a block diagram illustrating one example of an incident module.

FIG. 5 is a block diagram illustrating one example of an incident module 215-a. The incident module 215-a may be one example of the incident module 215 depicted in FIG. 2. As depicted, the incident module 215-a may include a new incident recognition module 505, a parameters module 510, and a similarities module 515.

The new incident recognition module 505 may recognize when a new incident is added to the incident log or when a new incident has occurred even before the new incident is added to the incident log. In some cases, the new incident recognition module 505 may send a notice to the incident module of the new incident.

The parameters module 510 may parse parameters of the new incident. In some cases, the parameters module 510 may parse the new incident using the same parameters identified by the parameterization module 210-a depicted in FIG. 4. In some cases, the parameters module 510 may add new categories of identified parameters associated with the new incident.

The similarities module 515 may cause the new incident to be grouped with other incidents that has at least one similar parameter. In some cases, the new incident has parameters that match parameters of multiple groups. In this circumstance, the new incident may be associated with multiple groups.

Figure 6:
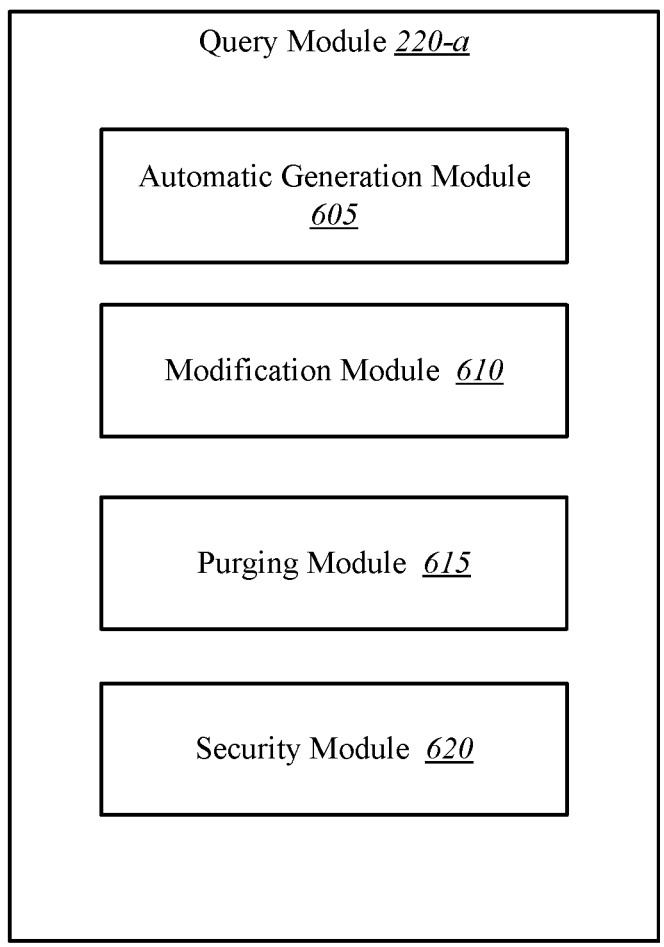
FIG. 6 is a block diagram illustrating an example of a query module.

FIG. 6 is a block diagram illustrating one example of a query module 220-a. The query module 220-a may be one example of the query module 220 depicted in FIG. 2. As depicted, the query module 220-a may include an automatic generation module 605, a modification module 610, a purging module 615, and a security module 620.

The automatic generation module 605 may automatically create a query in response to a new incident. The query may be based at least in part on a parameter in the new incident that is similar to or that matches a parameter of a previous query for a previous incident. In some cases, the automatically generated query may be identical to a previous query that had been drafted by an analyst when investigating an incident that includes similar characteristics to the new incident. In some cases, if the incident appears to be very similar to the previous incident, the automatic generation module 605 may automatically generate the same query or queries that were used in the previous investigation. In some other cases, the previous incident may share some parameters with the new incident, but not all of the parameters. In this circumstance, the automatic generation module 605 may generate a query that includes some elements of the previous used query, but that is more customized for the new incident. In some cases, the automatic generation module 605 may generate a query that is a hybrid of multiple previously used queries. In some cases, at least one field of the automated query is automatically pre-populated based at least in part on one or more parameters of a query associated with a prior incident.

The modification module 610 may modify the query based at least in part on user input. The automatically generated query may be presented to the analyst in a field. The analyst may decide whether to use the query or not. In some cases, the analyst may provide feedback to the modification module 610 that the query is undesirable. In some circumstances, the analyst may instruct the modification module 610 on how to modify the query. In other cases, the modification module 610 may go through a process to determine how the query should be modified to be more helpful to the analyst. In some examples, the analyst may decide to use the query, but the query may be unsuccessful. In this circumstance, the analyst may provide feedback that the query was unsuccessful or the modification module 610 may determine that the query was unsuccessful without the analyst's feedback. In some cases where the query was unsuccessful, the modification module 610 may modify the query to have a higher likelihood of being successful.

The purging module 615 may remove a query from the database. The purging module 615 may remove the query in response to at least one of the analyst's feedback, to at least one unsuccessful run with the query, to another condition, or combinations thereof. In some cases, the purging module 615 may remove the query from each of the shared parameter groups that the query is associated with. In other examples, purging module 615 removes the query from being associated with just selected groupings.

The security module 620 may perform a security action based at least in part on an analysis of the new incident. Performing the security action may include at least one of identifying potential malware as a result of performing one or more of the multiple queries, quarantining software associated with the new incident, quarantining a remote computing device associated with the new incident, wiping or resetting the remote computing device associated with the new incident, updating one or more firewall rules of a network device associated with the new incident, or any combination thereof.

Figure 7:
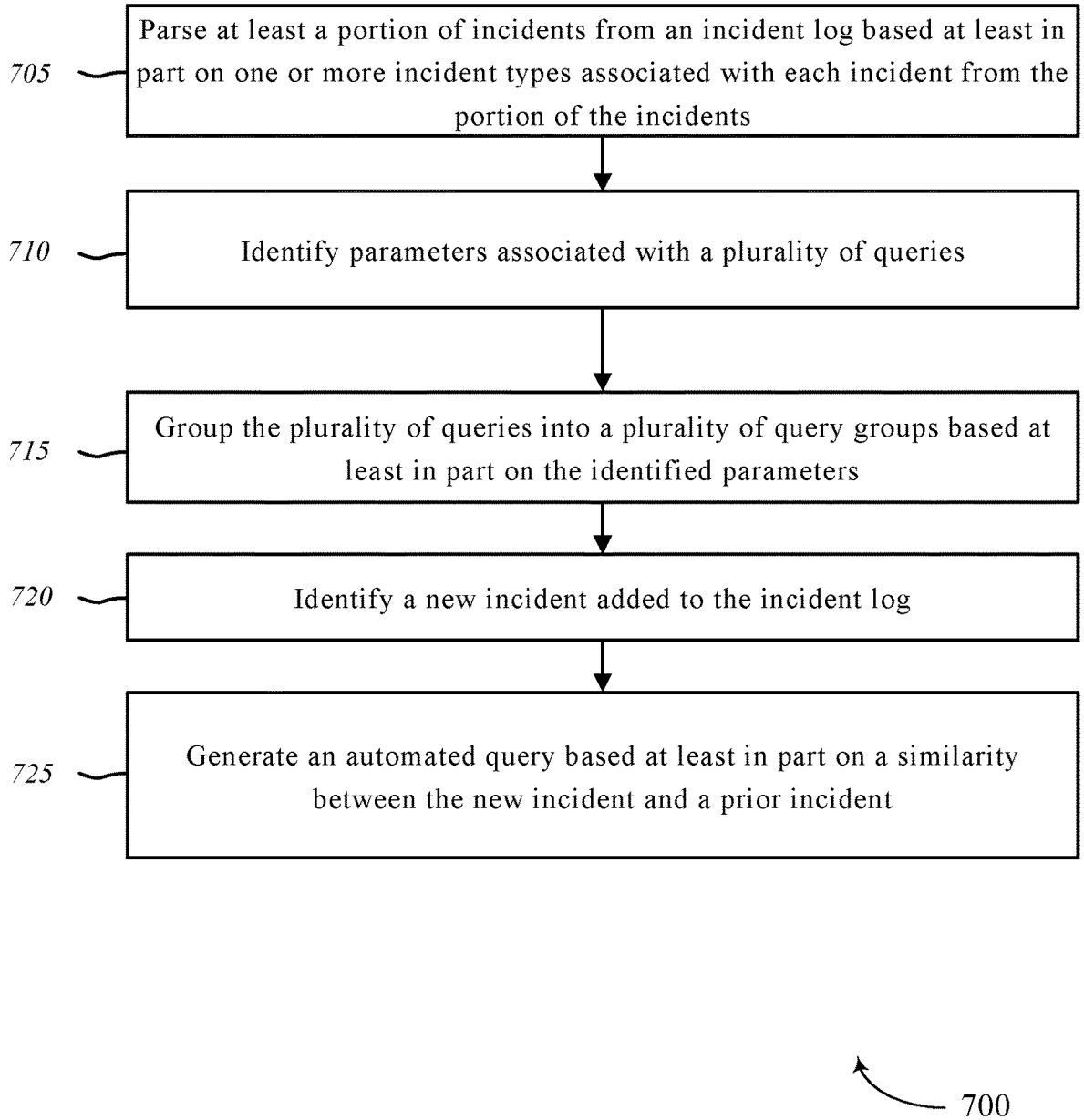
FIG. 7 is a flow diagram illustrating one embodiment of a method for learning queries in automated incident remediation.

FIG. 7 is a flow diagram illustrating one embodiment of a method 700 for learning queries in automated incident remediation. In some configurations, the method 700 may be implemented by the query learning module 145 illustrated in FIG. 1 or 2. In some configurations, the method 700 may be implemented in conjunction with the application 140 illustrated in FIG. 1.

At block 705, the method 700 may include at least a portion of incidents being parsed from an incident log based at least in part on one or more incident types associated with each incident from the portion of the incidents. The incident log may include all the incidents that have occurred on a device or network of devices. The incidents may be analyzed and separated into groups. For example, the incidents may be separated into incident types. Further, the incidents may also include other types of parameters that can be used to further breakdown the incidents into groups.

A non-exhaustive list of parameters that may be used to parse the incidents in the incident log may include at least one of identification parameters, username parameters, password parameters, access parameters, permission parameters, account parameters, data storage parameters, other types of parameters, hostname parameters, connection credential parameters, domain information parameters, or combinations thereof.

At block 710, parameters associated with multiple queries are identified. These queries may have been performed on the incidents from the incident log at the time that the incidents occurred. Each query that was inputted into the system in response to each of the incidents may be recorded and associated with that incident. In some examples, just a subset of the queries are stored and associated with their respective incidents. In yet another example, just the queries for a subset of the incidents are recorded and stored.

At block 715, the multiple queries are group into multiple query groups based at least in part on the identified parameters. The identified parameters may be associated with their respective incidents. Each of the incidents may be grouped according to similar parameters. For example, those queries that were performed on incidents that share a common hostname may be grouped together. In other examples, those queries that were performed on incidents that share a common credential may also be grouped together. In some cases, the incidents may have different parameters that are in common with different incidents. In this type of example, the query may be associated with multiple groups. In some cases, a policy may restrict the number of groups that a single query may be associated with.

At block 720, a new incident added to the incident log may be identified. In response to an incident, the details about the incident can be added to the incident log by at least one of a server, a device affected by the incident, a software agent running on a device affected by the incident, a remote device monitoring a device affected by the incident, other types of devices, or combinations thereof. In some cases, the incident is identified when a request is made to the database storing the incident log to retrieve information about new incidents. In some cases, a message is sent in response to a new incident being recorded on the incident log. In yet another example, the incident is identified first based on the effect the incident is having, and in response to identifying the incident, the incident is added to the incident log.

At block 725, an automated query based at least in part on a similarity between the new incident and a prior incident is generated. The prior incident may be added to the incident log prior to identifying the new incident. The query may be generated based at least on one parameter that is similar between the prior incident and the new incident.

For example, an analyst may have performed a first query on the prior incident. The prior incident may have at least one parameter that is common with the new incident. Based on the similarity, the queries associated with the prior incident may be grouped together, and the first query may be grouped with other queries that have at least one parameter in common with their respective incidents. In some cases, the first query may be associated with other groups that also have similar parameters with the first incident.

The new incident may have multiple similar parameters with the prior incident, and the prior incident may be the incident from the incident log that is most like the new incident. As a result, the first query may be generated automatically. The first query may be presented to the analyst in a field where the analyst would other wise type a new query as the analyst investigates the new incident. In some cases, the first query may be written exactly as the first query was written when it was original typed in response to the prior incident. In some cases, the first incident may be refined to reflect updates to the system, device, and/or network. In other examples, the first query may be a modified query that was previously altered based on feedback from the analyst. In yet another example, the automatically generated query may represent multiple queries that pull form different incidents. In this case, the new incident may have multiple parameters that are in common with multiple prior incidents and none of the previously used queries are a good match for the new incident. In this case, the automatically generated query may be a hybrid of multiple previously used queries.

The analyst may decide to perform the automatically generated query on the new incident. In other examples, the analyst may decide to perform a different query on the new incident.

Figure 8:
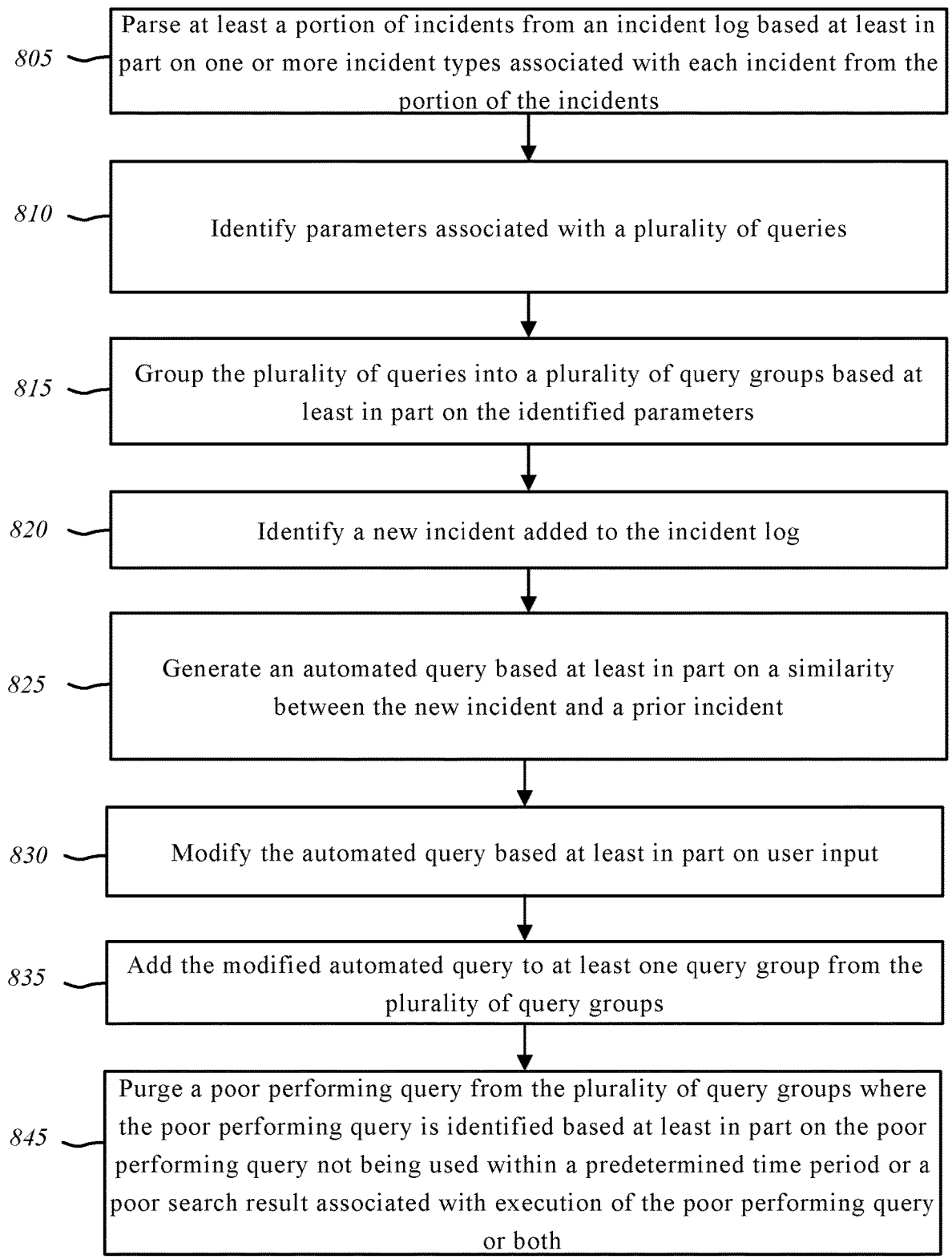
FIG. 8 is a flow diagram illustrating one embodiment of a method learning queries in automated incident remediation.

FIG. 8 is a flow diagram illustrating one embodiment of a method 800 for learning queries in automated incident remediation. In some configurations, the method 800 may be implemented by the query learning module 145 illustrated in FIG. 1 or 2. In some configurations, the method 800 may be implemented in conjunction with the application 140 illustrated in FIG. 1.

At block 805, the method 800 at least a portion of incidents is parsed from an incident log based at least in part on one or more incident types associated with each incident from the portion of the incidents. The incident log may include all the incidents that have occurred on a device or network of devices. The incidents may be analyzed and separated into groups. For example, the incidents may be separated into incident type. Further, the incidents may also include other types of parameters that can be used to further breakdown the incidents into groups.

A non-exhaustive list of parameter that may be used to parse the incidents in the incident log may include at least one of identification parameters, username parameters, password parameters, access parameters, permission parameters, account parameters, data storage parameters, other types of parameters, hostname parameters, connection credential parameters, domain information parameters, or combinations thereof.

At block 810, parameters associated with multiple queries are identified. These queries may have been performed on the incidents from the incident log at the time that the incidents occurred. Each query that was inputted into the system in response to each of the incidents may be recorded and associated with that incident. In some examples, just a subset of the queries are stored and associated with their respective incidents. In yet another example, just the queries for a subset of the incidents are recorded and stored.

At block 815, the multiple queries are group into multiple query groups based at least in part on the identified parameters. The identified parameters may be associated with their respective incidents. Each of the incidents may be grouped according to similar parameters. For example, those queries that were performed on incidents that share a common hostname may be grouped together. In other examples, those queries that were performed on incidents that share a common credential may also be grouped together. In some cases, the incidents may have different parameters that are in common with different incidents. In this type of example, the query may be associated with multiple groups. In some cases, a policy may restrict the number of groups that a single query may be associated with.

At block 820, a new incident added to the incident log is identified. In response to an incident, the details about the incident can be added to the incident log by at least one of a server, a device affected by the incident, a software agent running on a device affected by the incident, a remote device monitoring a device affected by the incident, or combinations thereof. In some cases, the incident is identified when a request is made to the database storing the incident log to retrieve information about new incidents. In some cases, a message is sent in response to a new incident being recorded on the incident log. In yet another example, the incident is identified first based on the effect the incident is having, and in response to identifying the incident, the incident is added to the incident log.

At block 825, an automated query based at least in part on a similarity between the new incident and a prior incident is generated. The prior incident may be added to the incident log prior to identifying the new incident. The query may be generated based at least on one parameter that is similar between the prior incident and the new incident.

For example, an analyst may have performed a first query on the prior incident. The prior incident may have at least one parameter that is common with the new incident. Based on the similarity, the queries associated with the prior incident may be grouped together, and the first query may be grouped with other queries that have at least one parameter in common with their respective incidents. In some cases, the first query may be associated with other groups that also have similar parameters with the first incident.

The new incident may have multiple similar parameters with the prior incident, and the prior incident may be the incident from the incident log that is most like the new incident. As a result, the first query may be generated automatically. The first query may be presented to the analyst in a field where the analyst would other wise type a new query as the analyst investigates the new incident. In some cases, the first query may be written exactly as the first query was written when it was original typed in response to the prior incident. In some cases, the first incident may be refined to reflect updates to the system, device, and/or network. In other examples, the first query may be a modified query that was previously altered based on feedback from the analyst. In yet another example, the automatically generated query may represent multiple queries that pull form different incidents. In this case, the new incident may have multiple parameters that are in common with multiple prior incidents and none of the previously used queries are a good match for the new incident. In this case, the automatically generated query may be a hybrid of multiple previously used queries.

The analyst may decide to perform the automatically generated query on the new incident. In other examples, the analyst may decide to perform a different query on the new incident.

At block 830, the automatically generated query is modified at least in part on user input. In some cases, the analyst may decide that the automatically generated query is insufficient or otherwise undesirable to perform on the new incident. In some cases, the analyst may input a message indicating at least one of what is undesirable about the message, which portions of the automatically generated query are desirable to keep, why portions of the automatically generated query are undesirable, other information about the automatically generated query, or combinations thereof. In response to this feedback, the system may modify the query. In some cases, the analyst may manually insert the modifications into the automatically generated query. In other examples, the system may consider the feedback and make changes to the automatically generated query without further assistance from the analyst.

At block 835, the modified automated query is added to at least one query group from the multiple query groups. With the modified automated query added to at least one of the query groups, the modified automated query may be available to pull from for future incidents.

At block 840, a poor performing query is purged from the multiple query groups where the poor performing query is identified based at least in part on the poor performing query not being used within a predetermined time period or a poor search result associated with execution of the poor performing query or both. In some cases, the poor performing query may be removed based on its poor performance when the query was originally used on a prior incident or the poor performing query may be removed in response to poor performance when performed on a new incident.

In some cases, if a query has a poor performance, the poor performing query is removed after a single instance. In other examples, the poor performing query may be remove only after the query performs poorly after a predetermined number of times. For example, to be purged, the poor performing query may need to perform poorly for three times before it is removed. In some cases where the query can perform poorly for a number of instances before being removed, the poor performing query may be less likely to be used by lowering a confidence score even after a single poor performance.

In some examples, a performance score may be tracked for each of the automatically generated queries and manually inputted queries. In some cases, all queries that perform such that they have a low performance score are removed from the database. In some cases, even those queries that have performance that is above a threshold for having to be removed, may still be removed if there are other queries that are similar to them, but have may better performance scores.

Figure 9:
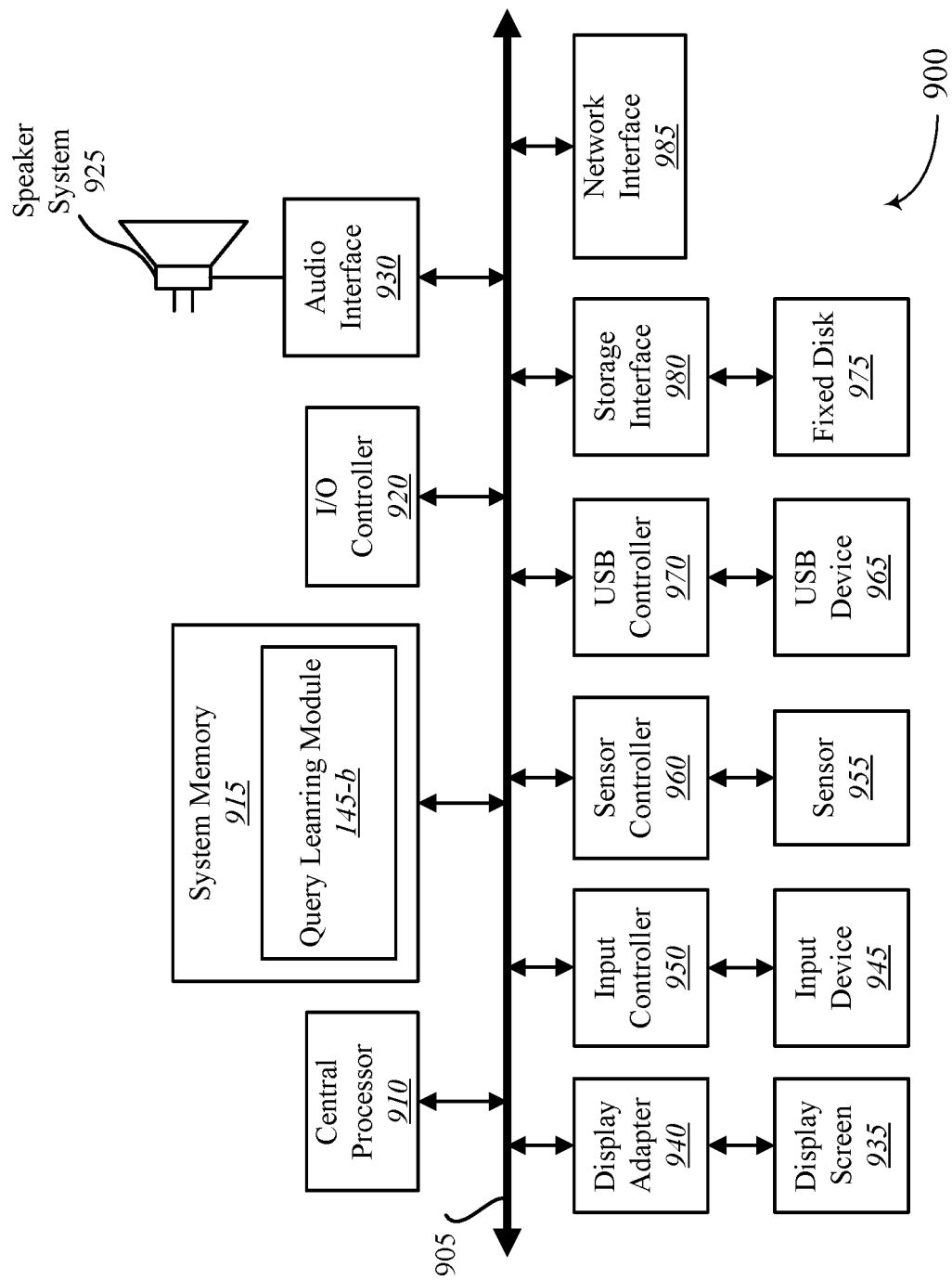
FIG. 9 depicts a block diagram of an example of a computer system suitable for implementing the present systems and methods.

FIG. 9 depicts a block diagram of a computing device 900 suitable for implementing the present systems and methods. The device 900 may be an example of device 105, and/or server 110 illustrated in FIG. 1. In one configuration, device 900 includes a bus 905 which interconnects major subsystems of device 900, such as a central processor 910, a system memory 915 (typically RAM, but which may also include ROM, flash RAM, or the like), an input/output controller 920, an external audio device, such as a speaker system 925 via an audio output interface 930, an external device, such as a display screen 935 via display adapter 940, an input device 945 (e.g., remote control device interfaced with an input controller 950), multiple USB devices 965 (interfaced with a USB controller 970), and a storage interface 980. Also included are at least one sensor 955 connected to bus 905 through a sensor controller 960 and a network interface 985 (coupled directly to bus 905).

Bus 905 allows data communication between central processor 910 and system memory 915, which may include read-only memory (ROM) or flash memory (neither shown), and random access memory (RAM) (not shown), as previously noted. The RAM is generally the main memory into which the operating system and application programs are loaded. The ROM or flash memory may contain, among other code, the Basic Input-Output system (BIOS) which controls basic hardware operation such as the interaction with peripheral components or devices. For example, the query learning module 145-b to implement the present systems and methods may be stored within the system memory 915. Applications (e.g., application 140) resident with device 900 are generally stored on and accessed via a non-transitory computer readable medium, such as a hard disk drive (e.g., fixed disk 975) or other storage medium. Additionally, applications may be in the form of electronic signals modulated in accordance with the application and data communication technology when accessed via interface 985.

Storage interface 980, as with the other storage interfaces of device 900, may connect to a standard computer readable medium for storage and/or retrieval of information, such as a fixed disk drive 975. Fixed disk drive 975 may be a part of device 900 or may be separate and accessed through other interface systems. Network interface 985 may provide a direct connection to a remote server via a direct network link to the Internet via a POP (point of presence). Network interface 985 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 900 wirelessly via network interface 985.

Many other devices and/or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 9 need not be present to practice the present systems and methods. The devices and subsystems may be interconnected in different ways from that shown in FIG. 9. The aspect of some operations of a system such as that shown in FIG. 9 are readily known in the art and are not discussed in detail in this application. Code to implement the present disclosure may be stored in a non-transitory computer-readable medium such as one or more of system memory 915 or fixed disk 975. The operating system provided on device 900 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with system 900 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 985 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

The I/O controller 920 may operate in conjunction with network interface 985 and/or storage interface 980. The network interface 985 may enable system 900 with the ability to communicate with client devices (e.g., device 105 of FIG. 1), and/or other devices over the network 115 of FIG. 1. Network interface 985 may provide wired and/or wireless network connections. In some cases, network interface 985 may include an Ethernet adapter or Fibre Channel adapter. Storage interface 980 may enable system 900 to access one or more data storage devices. The one or more data storage devices may include two or more data tiers each. The storage interface 980 may include one or more of an Ethernet adapter, a Fibre Channel adapter, Fibre Channel Protocol (FCP) adapter, a SCSI adapter, and iSCSI protocol adapter.

Figure 10:
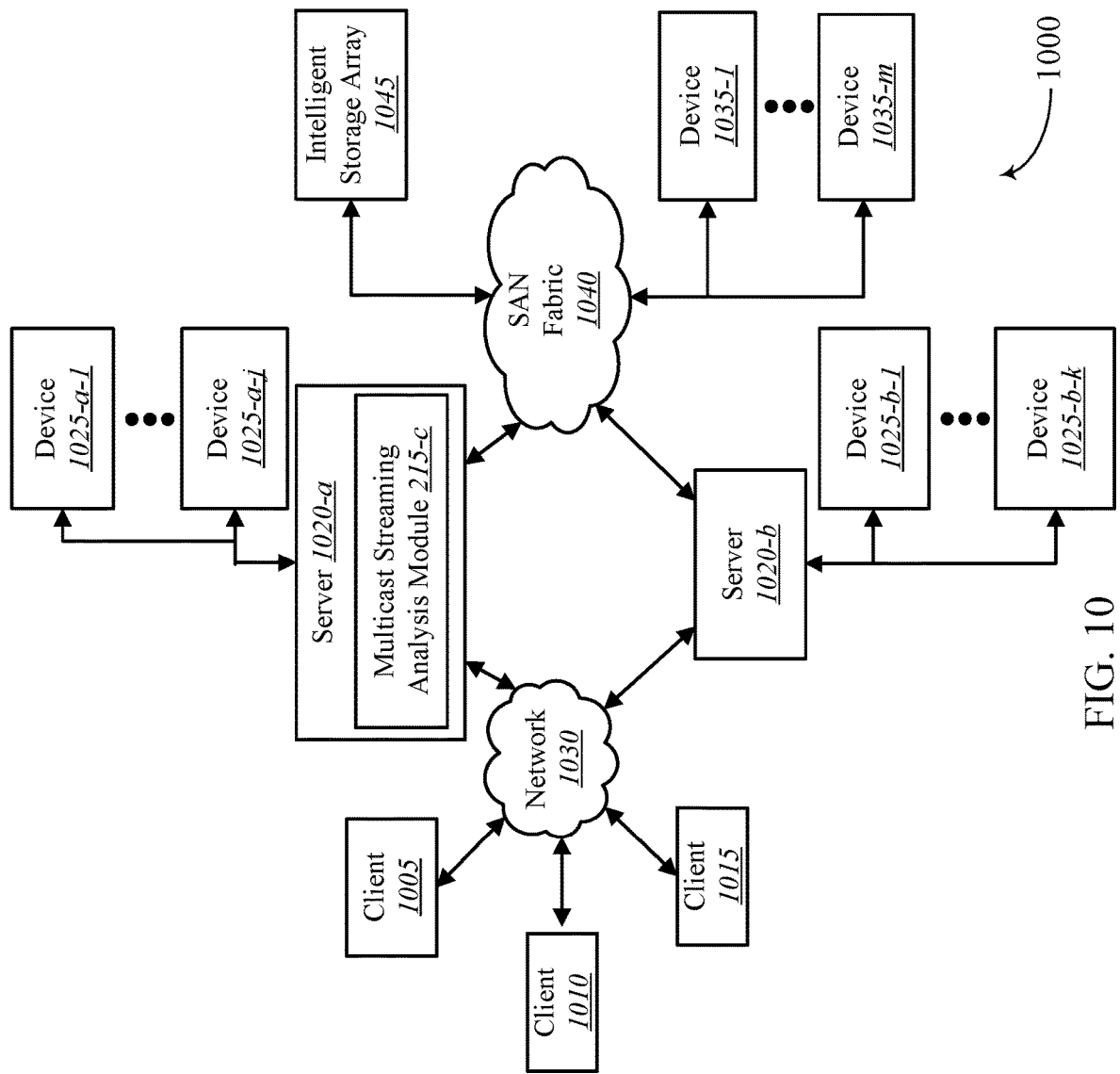
FIG. 10 depicts a block diagram of an example of a computer system suitable for implementing the present systems and methods.

FIG. 10 is a block diagram depicting a network architecture 1000 in which client systems 1005, 1010 and 1015, as well as storage servers 1020-a and 1020-b (any of which can be implemented using computer system 900), are coupled to a network 1030. In one embodiment, events module 145-c may be located within one of the storage servers 1020-a, 1020-b to implement the present systems and methods. Events module 145-c may be one example of events module 145 depicted in FIGS. 1, 2, and/or 9. The storage server 1020-a is further depicted as having storage devices 1025-a-1 through 1025-a-j directly attached, and storage server 1020-b is depicted with storage devices 1025-b-1 through 1025-b-k directly attached. SAN fabric 1040 supports access to storage devices 1035-1 through 1035-m by storage servers 1020-a and 1020-b, and so by client systems 1005, 1010 and 1015 via network 1030. Intelligent storage array 1045 is also shown as an example of a specific storage device accessible via SAN fabric 1040.

With reference to computer system 900, network interface 985 or some other method can be used to provide connectivity from each of client computer systems 1005, 1010 and 1015 to network 1030. Client systems 1005, 1010 and 1015 are able to access information on storage server 1020-a or 1020-b using, for example, a web browser or other client software (not shown). Such a client allows client systems 1005, 1010 and 1015 to access data hosted by storage server 1020-a or 1020-b or one of storage devices 1025-a-1 to 1025-a-j, 1025-b-1 to 1025-b-k, 1035-1 to 1035-m or intelligent storage array 1045. FIG. 10 depicts the use of a network such as the Internet for exchanging data, but the present systems and methods are not limited to the Internet or any particular networkbased environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures may be implemented to achieve the same functionality.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining that a file likely includes some type of malware. For example, types of security actions may include preventing the file from performing any actions on the computing device, alerting an administrator to the potential maliciousness of the file, quarantine the file, delete the file, block a download of the file, and/or warn a user about the file. In addition, the systems described herein may perform a security action on objects other than a file. For example, the systems described herein may blacklist malicious URLs and/or IP addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A computer-implemented method for learning queries in automated incident remediation, the method being performed by one or more computing devices, each comprising one or more processors, the method comprising:

parsing at least a portion of incidents from an incident log based at least in part on one or more incident types associated with each incident from the portion of the incidents;

identifying parameter values associated with the incidents from the incident log, each incident being associated with one of a plurality of queries being performed on the incidents from the incident log;
grouping the plurality of queries into a plurality of query groups based at least in part on the identified parameter values;
identifying a new incident added to the incident log;
comparing the new incident to the incidents from the incident log;
identifying a common parameter value between the new incident and a prior incident of the identified parameter values associated with the incidents from the incident log based at least in part on the comparing, the prior incident being added to the incident log prior to identifying the new incident;
identifying a query performed on the prior incident of the incidents from the incident log based at least in part on the prior incident being associated with the common parameter value;
generating an automated query based at least in part on the identified query;
modifying the automated query based at least in part on user input;
adding the modified automated query to at least one query group from the plurality of query groups; and
purging a poor performing query from the plurality of query groups, wherein the poor performing query is identified based at least in part on the poor performing query not being used within a predetermined time period or a poor search result associated with execution of the poor performing query, or both.

2. The method of claim 1, wherein at least one field of the automated query is automatically pre-populated with a field value of the identified query performed on the prior incident.

3. The method of claim 1, comprising:
identifying one or more parameter values of a user query performed on the new incident; and
adding the user query to the at least one query group from the plurality of query groups based at least in part on the one or more parameter values of the user query.

4. The method of claim 1, comprising:
performing a security action based at least in part on analysis of the new incident.

5. The method of claim 4, wherein performing the security action includes at least one of identifying potential malware as a result of performing one or more of the plurality of queries, quarantining software associated with the new incident, quarantining a remote computing device associated with the new incident, wiping or resetting the remote computing device associated with the new incident, updating one or more firewall rules of a network device associated with the new incident, or any combination thereof.

6. The method of claim 1, wherein the incident log records incidents associated with one or more remote computing devices.

7. The method of claim 1, wherein each query from the plurality of queries is associated with at least one incident from the incident log.

8. The method of claim 1, wherein at least one of the queries from the plurality of queries is performed on a parsed portion of the incident log.

9. The method of claim 1, wherein at least one of the queries from the plurality of queries is performed on an unparsed portion of the incident log.

10. A computing device configured for learning queries in automated incident remediation, comprising:
a processor;
memory in electronic communication with the processor, wherein the memory stores computer executable instructions that when executed by the processor cause the processor to perform the steps of:
parsing at least a portion of incidents from an incident log based at least in part on one or more incident types associated with each incident from the portion of the incidents;
identifying parameter values associated with the incidents from the incident log, each incident being associated with one of a plurality of queries being performed on the incidents from the incident log;
grouping the plurality of queries into a plurality of query groups based at least in part on the identified parameter values;
identifying a new incident added to the incident log;
comparing the new incident to the incidents from the incident log;
identifying a common parameter value between the new incident and a prior incident of the identified parameter values associated with the incidents from the incident log based at least in part on the comparing, the prior incident being added to the incident log prior to identifying the new incident;
identifying a query performed on the prior incident of the incidents from the incident log based at least in part on the prior incident being associated with the common parameter value;
generating an automated query based at least in part on the identified query;
modifying the automated query based at least in part on user input;
adding the modified automated query to at least one query group from the plurality of query groups; and
purging a poor performing query from the plurality of query groups, wherein the poor performing query is identified based at least in part on the poor performing query not being used within a predetermined time period or a poor search result associated with execution of the poor performing query, or both.

11. The device of claim 10, wherein the executable instructions when executed cause the processor to perform the step of:
identifying one or more parameter values of a user query performed on the new incident; and
adding the user query to the at least one query group from the plurality of query groups based at least in part on the one or more parameter values of the user query.

12. The device of claim 10, wherein the executable instructions when executed cause the processor to perform the step of:
performing a security action based at least in part on analysis of the new incident.

13. The device of claim 12, wherein performing the security action includes at least one of identifying potential malware as a result of performing one or more of the plurality of queries, quarantining software associated with the new incident, quarantining a remote computing device associated with the new incident, wiping or resetting the remote computing device associated with the new incident, updating one or more firewall rules of a network device associated with the new incident, or any combination thereof.

14. The device of claim 10, wherein at least one of the queries from the plurality of queries is performed on a parsed portion of the incident log.

15. The device of claim 10, wherein at least one of the queries from the plurality of queries is performed on an unparsed portion of the incident log.

16. A computer-program product for using customer context to detonate malware, the computer-program product comprising a non-transitory computer-readable medium storing instructions thereon, the instructions being executable by a processor to:

parse at least a portion of incidents from an incident log based at least in part on one or more incident types associated with each incident from the portion of the incidents;

identify parameter values associated with the incidents from the incident log, each incident being associated with one of a plurality of queries being performed on the incidents from the incident log;

group the plurality of queries into a plurality of query groups based at least in part on the identified parameter values;

identify a new incident added to the incident log;

compare the new incident to the incidents from the incident log;

identify a common parameter value between the new incident and a prior incident of the identified parameter values associated with the incidents from the incident log based at least in part on the comparing, the prior incident being added to the incident log prior to identifying the new incident;

identify a query performed on the prior incident of the incidents from the incident log based at least in part on the prior incident being associated with the common parameter value;

generate an automated query based at least in part on the identified query;

modifying the automated query based at least in part on user input;

adding the modified automated query to at least one query group from the plurality of query groups; and purging a poor performing query from the plurality of query groups, wherein the poor performing query is identified based at least in part on the poor performing query not being used within a predetermined time period or a poor search result associated with execution of the poor performing query, or both.

* * * * *